United States Patent [19]

Krueger

[11] 4,416,929
[45] Nov. 22, 1983

[54] MULTILAYER STITCHED KNITTED FIBERGLASS COMPOSITE

[75] Inventor: Ronald G. Krueger, Seguin, Tex.

[73] Assignee: Proform, Inc., Minneapolis, Minn.

[21] Appl. No.: 279,649

[22] Filed: Jul. 2, 1981

[51] Int. Cl.³ .............................................. B32B 3/06
[52] U.S. Cl. .................... 428/102; 280/610; 428/109; 428/110; 428/111; 428/113; 428/257; 428/285; 428/292; 428/408; 428/426
[58] Field of Search .............. 428/105, 107, 108, 109, 428/110, 112, 113, 114, 285, 292, 408, 426, 253, 228, 102, 257; 156/177, 178, 93, 148; 112/402, 405, 412, 415, 416, 420, 421, 429, 430; 280/610

[56] References Cited

U.S. PATENT DOCUMENTS

| | | | |
|---|---|---|---|
| 3,600,259 | 8/1971 | Smith et al. | 428/257 |
| 3,819,461 | 6/1974 | Saffadi | 428/111 |
| 3,819,469 | 6/1974 | Balch et al. | 428/107 |
| 3,935,354 | 1/1976 | Olcott | 428/107 |
| 3,983,281 | 9/1976 | Wakeman | 428/257 |
| 4,071,647 | 1/1978 | McMullen | 428/105 |
| 4,298,645 | 11/1981 | Obayashi et al. | 428/107 |
| 4,320,160 | 3/1982 | Nishimura et al. | 428/111 |

FOREIGN PATENT DOCUMENTS 7605534  11/1976  Netherlands ................ 428/114

*Primary Examiner*—James J. Bell
*Attorney, Agent, or Firm*—Oblon, Fisher, Spivak, McClelland & Maier

[57] ABSTRACT

A structural fabric of high torsion resistance and stiffness is provided. The fabric is a three-layered double biased fabric, the first layer being comprised of parallel structural fibers biased from the longitudinal center line of the fabric, the middle layer being comprised of parallel structural fibers of twice the weight of the fibers of the first layer and aligned at an angle of 90° to those of the first layer and a third layer of parallel structural fibers of the same weight as those of the first layer and aligned at 90° to those of the second layer. The fibers and layers may be held in place and affixed by use of secondary knitted or sewn yarns or threads, and the entire fabric may be saturated with a curable resin.

9 Claims, 4 Drawing Figures

MULTILAYER STITCHED KNITTED FIBERGLASS COMPOSITE

BACKGROUND OF THE INVENTION

1. Field of the Invention

This invention relates to a three-layer, double biased structural fabric, more particularly to a three-layer double biased structural fabric which is especially designed to be lightweight and yet exhibit high stiffness and torsion resistance qualities.

2. Description of the Prior Art

Structural fabrics which are made on a bias, i.e., where the material of the fabric is aligned at an angle to the longitudinal center line of the fabric, have hitherto been known. It has also been known to provide a multi-layer fabric, with different layers biased in different directions, to provide a structural fabric with strength in more than one direction, specifically, in the directions of the different angles of alignment. However, where such structural fabrics have been employed, due to the fact that they are far lighter than the structural materials they are used to replace, such as steel, a number of defects have appeared. One of these defects is that the structural fabrics of the prior art lack the stiffness of the corresponding structural materials such as steel and wood. Another defect is that these structural fabrics, even when biased, exhibit low or insufficient torsional resistance for certain applications. Thus, where the application of such fabrics involves their use in a device which is subjected to high torsional stresses, the lack of torsion resistance can only be overcome, if at all, by the addition of many layers of fabric, which defeats the twin goals of a lightweight structural material that is relatively inexpensive and easy to prepare.

SUMMARY OF THE INVENTION

One object of this invention is to overcome the above-noted defects.

Another object of this invention is to provide a structural fabric which is lightweight and relatively inexpensive to prepare.

Yet another object of this invention is to provide a structural fabric which can be employed wherever high strength and lightweight materials are desirable, such as the aeronautic, automotive and marine industries.

It is another object of this invention to provide a structural fabric which is useful, whether employed alone or laminated with other materials, in the manufacture of skis.

The objects of this invention can be accomplished by using a double biased, three-layer fabric which is provided by affixing a first layer of biased, substantially parallel structural fibers to a second layer of substantially parallel structural fibers aligned at an angle of approximately 90° to those of the first layer and of approximately twice the weight of those of the first layer, and further affixing a third layer of parallel structural fibers aligned at the same angle as those of the first layer, and of approximately equal weight of those of the first layer.

DETAILED DESCRIPTION OF THE INVENTION

Figure 1:
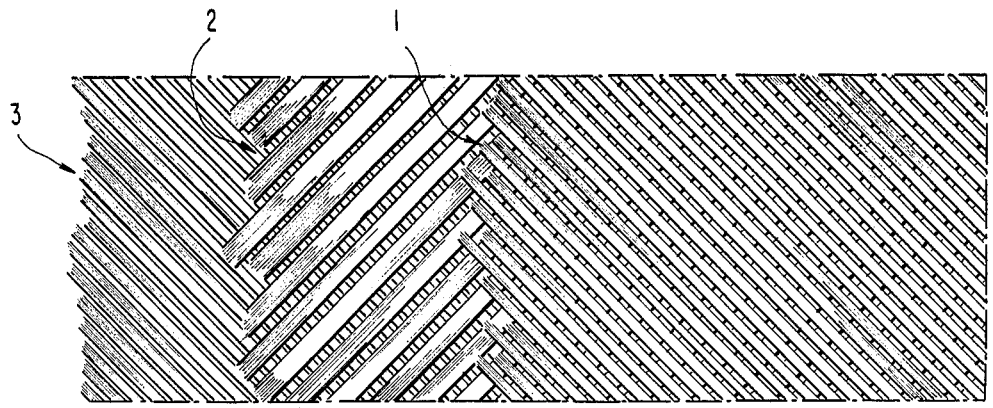
FIG. 1 is a surface view of the three-layer, double biased fabric of the invention, with layers cut away so as to illustrate more clearly the nature of the invention.
Figure 2:
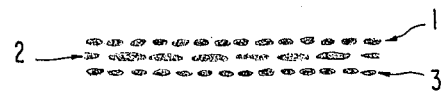
FIG. 2 is a longitudinal cross-section view of the fabric depicted in FIG. 1.

The structural fabric of this invention is comprised of at least three discrete layers, as is shown in FIG. 1. The first layer 1 is comprised of a series of closely spaced, parallel, structural fibers all aligned at an angle to the longitudinal center line of the fabric itself. The middle layer 2 is similarly composed of parallel structural fibers. The fibers of this second layer are approximately twice the weight of those of the first layer. As is shown in FIG. 1, the fibers of the second layer are also aligned at an angle to the longitudinal center line, that angle being one of 90° to the alignment of the fibers of the first layer. A third layer 3, also composed of a series of parallel structural fibers is affixed to the second layer on the side opposite that to which the fixed first layer is affixed. The fibers of this third layer are of the same weight as those in the first layer, and are aligned at the same angle to the longitudinal center line as are those of the first layer.

Figure 3:
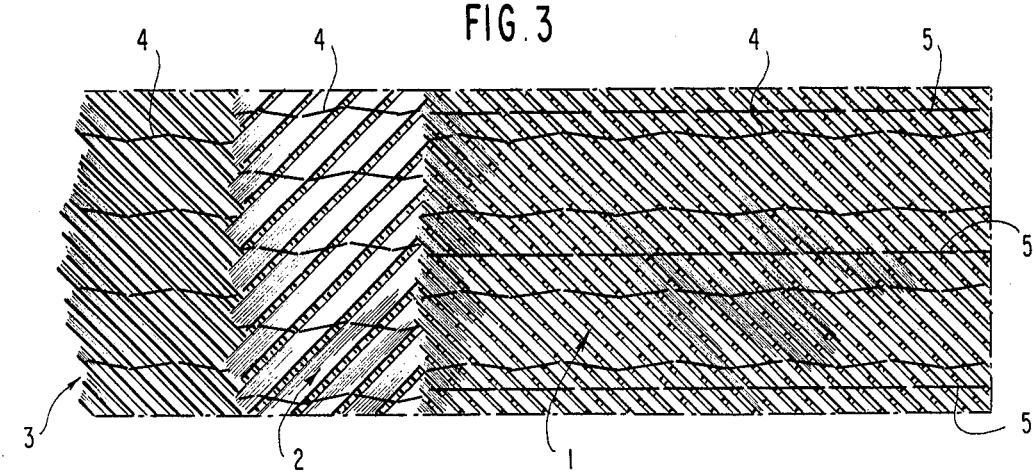
FIG. 3 is a surface view of the preferred embodiment of this invention, illustrating the use of secondary yarns to maintain the fabric alignment.

The layers of the structural fabric of this invention can be affixed to each other through any of a number of methods well known to those of ordinary skill in the art, provided that the material used to affix the layers to each other is suitable for the ultimate purpose for which the structural fabric is to be used. Similarly, the fibers of each layer may be held in parallel alignment by any of a number of well-known methods. A preferred embodiment, as shown in FIG. 3, involves the use of secondary yarns 4 or threads which are sewn or knitted between the fibers of each layer, and secondary yarns 5 between the three layers, similarly sewn or knitted, by methods that are known to those of skill in the art.

Figure 4:
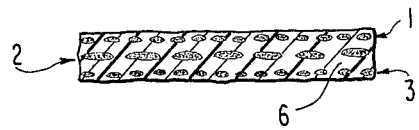
FIG. 4 is a longitudinal cross-section of a further preferred embodiment illustrating the use of resin encapsulation.

Although the structural fabric herein disclosed and claimed has a variety of uses without further modification, in one preferred embodiment, as is shown in FIG. 4, the fabric is encapsulated, saturated and penetrated with a commercial resin 6, which is capable of adding strength and body to the fabric at little weight expense. As one of ordinary skill in the art will realize, any of a number of commercially available resins will be satisfactory for this purpose, including, but not limited to, epoxy and polyester resins.

Although the structural fibers of this fabric can be made of any of a number of commercially available materials, including, but not limited to, carbon fibers and synthetic yarns, in a preferred embodiment, these fibers are composed of stranded fiberglass. Applicant has found that, when made of fiberglass, this structural material gives a suprising and highly desirable combination of high strength, torsional resistance and good stiffness.

In one preferred embodiment, the fiberglass structural fibers employed in the outer layers have a yield of 1200, that is, there are 1200 yds./lb of fiber. When such a fiber is employed, the fabric has a weight of approximately 24 oz./sq.yd. One of skill in the art will recognize that the weight of the fibers employed in this invention is not critical, and can vary over a wide range.

In order that this structural fabric exhibit the high torsional resistance and stiffness qualities that are among its desirable features, it is critical that the second or middle layer of the three layer fabric have its structural fibers aligned at an angle of 90° to those of the other two layers. Although this relationship can be achieved through any of a number of methods, one particularly efficacious method is that disclosed in the copending U.S. patent application Ser. No. 210,852. The three layers of parallel fibers comprising the structural fabric of this invention, in this preferred process of making the fabric, are formulated individually. Each layer is therefore comprised of a series of parallel structural fibers, all aligned parallel to the longitudinal center line of the layer, and held together by any of a number of methods, including secondary yarns or threads sewn therebetween. Each layer of fabric is then pulled off a roll and led through counter-rotating rollers. Once passing through the rollers, the layer is led, at an angle corresponding to the angle of the bias of the parallel fibers of that particular layer, into a knitting machine, where the three layers are joined together.

It is to be understood that the bias angle of the structural yarn with respect to the longitudinal center line of the fabric may range through angles from 0° to 180°. It has been discovered, however, that a preferred embodiment, with particularly important application to the ski industry, is present where the upper and lower layers are biased at an angle of 45° to the longitudinal center line of the fabric, and the second or middle layer is biased at an angle of 135°. Accordingly, to make such an embodiment by the process described above, the upper and lower layers are pulled off the counter-rotating rollers into the knitting machine at an angle of 45°, and the middle layer, led into the machine in between the other layers, is pulled off another set of counter-rotating rollers at an angle of 135°.

Once knitted or otherwise affixed, the fabric may be further improved by saturating it with a curable resin. It will be recognized that any of a number of commercially available resins will be satisfactory in this use, including, but not limited to polyester or epoxy resins.

In many cases, the three layer double biased fabric of this invention will have important applications wherein it is present in a laminate with other layers of structural fabric or other structural materials, such as steel, wood or fiberglass. It will be recognized that any of a wide number of methods of adhering the structural fabric of this invention to the other layers in such a laminate will be suitable, depending on the particular application that is contemplated.

As indicated, the processes and embodiments disclosed above are merely representative of those processes and embodiments which could be used in practicing the structural fabric of this invention. It is to be understood, therefore, that not only the fabrics, but also the processes which have been set forth in the disclosure, are illustrative only. Hence, any changes made, especially in matters of shape, size, arrangement, and composition, to the full extent extended by the general meaning of the terms in which the appended claims are expressed, are within the principle of the invention.

What is claimed is:

1. A structural fabric comprising:
   a first layer of substantially parallel, structural fibers, aligned at an angle of 45° to the longitudinal center line of said first layer,
   a second layer of substantially parallel, structural fibers, affixed to said first layer, of approximately twice the weight of the fibers of said first layer, wherein said fibers of said second layer are aligned at an angle of 90° to those of the first layer, and
   a third layer, affixed to said second layer on the side opposite that to which said first layer is affixed, said third layer being comprised of substantially parallel, structural fibers, of a weight approximately equal to that of the fibers of said first layer, and aligned at an angle of 90° to those of said second layer,
   wherein said layers are affixed to each other by secondary yarns or threads stitched therebetween, and wherein the fibers of each layer are maintained in substantially parallel alignment by secondary yarns or threads stitched therebetween.

2. The structural fabric of claim 1, wherein the fabric is saturated with resin.

3. The structural fabric of claim 1, further comprising at least one other structural material laminated to said structural fabric.

4. The structural fabric of claim 2, further comprising at least one other structural material laminated to said structural fabric.

5. The structural fabric of claim 1, wherein said structural fibers in said first, second and third layers are comprised of fiberglass.

6. The structural fabric of claim 2, wherein said structural fibers of said first, second and third layers are comprised of fiberglass.

7. The structural fabric of claim 3, wherein said structural fibers of said first, second and third layers of said structural fabric are comprised of fiberglass.

8. The structural fabric of claim 4, wherein said structural fibers of said first, second and third layers of said structural fabric are comprised of fiberglass.

9. The structural fabric of claim 2, wherein said fabric is a structural element of a ski.

* * * * *